(12) United States Patent
Hofstee et al.

(10) Patent No.: US 6,865,631 B2
(45) Date of Patent: Mar. 8, 2005

(54) REDUCTION OF INTERRUPTS IN REMOTE PROCEDURE CALLS

(75) Inventors: Harm Peter Hofstee, Austin, TX (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 09/736,582

(22) Filed: Dec. 14, 2000

(65) Prior Publication Data

US 2002/0078285 A1 Jun. 20, 2002

(51) Int. Cl.[7] .......................... G06F 13/22; G06F 13/28
(52) U.S. Cl. ........................ 710/220; 710/46; 710/22
(58) Field of Search ...................... 710/220, 22–28, 710/260–269, 46–50; 712/244; 709/212, 213

(56) References Cited

U.S. PATENT DOCUMENTS

| | | | | |
|---|---|---|---|---|
| 4,862,350 A | * | 8/1989 | Orr et al. ..................... | 709/213 |
| 5,414,858 A | * | 5/1995 | Hoffman et al. .............. | 710/48 |
| 5,634,099 A | * | 5/1997 | Andrews et al. ............ | 709/212 |
| 6,055,579 A | * | 4/2000 | Goyal et al. ................ | 709/400 |
| 6,105,102 A | * | 8/2000 | Williams et al. ............ | 710/261 |
| 6,128,728 A | * | 10/2000 | Dowling ..................... | 712/228 |
| 6,434,651 B1 | * | 8/2002 | Gentry, Jr. .................. | 710/260 |
| 6,467,008 B1 | * | 10/2002 | Gentry et al. ............... | 710/261 |
| 6,549,881 B1 | * | 4/2003 | Dearth et al. ................. | 703/21 |

* cited by examiner

Primary Examiner—Sumati Lefkowitz
Assistant Examiner—Trisha Vu
(74) Attorney, Agent, or Firm—Robert A. Voigt, Jr.; Winstead Sechrest & Minick P.C.; Casimer K. Salys (57) ABSTRACT

A method and system for executing one or more remote procedure calls. In one embodiment, a method comprises the step of a processing unit issuing a plurality of commands to a corresponding DMA controller. One or more commands of the plurality of commands issued by the processing unit are to copy attached processing unit instructions associated with one or more Attached Processing Unit's (APU's) and data associated with the attached processing unit instructions from the shared memory to one or more APU's. The attached processing unit instructions may include instructions that enable the associated one or more APU's to perform one or more particular operations on the data. The method further comprises the DMA controller issuing an indication to the one or more APU's to perform the one or more operations on the data associated with the attached processing unit instructions. Instead of having the particular APU that completed its operation notify the corresponding processing unit of its completion of the operation, the DMA controller polls a status line of each of the one or more attached processing units to determine if any of the one or more attached processing units completed its operation. The DMA controller then copies the results of the operations after each of the one or more attached processing units completes its operation.

36 Claims, 5 Drawing Sheets

REDUCTION OF INTERRUPTS IN REMOTE PROCEDURE CALLS

CROSS REFERENCE TO RELATED APPLICATIONS

The present invention is related to the following U.S. Patent Applications which are incorporated herein by reference:

Ser. No. 09/736,356 entitled "Token Based DMA" filed Dec. 14, 2000.

Ser. No. 09/736,585 entitled "Symmetric Multi-Processing System" filed Dec. 14, 2000.

TECHNICAL FIELD

The present invention relates to the field of remote procedure calls in a Symmetric Multi-Processing (SMP) architecture, and more particularly to the reduction of interrupting processing units in remote procedure calls in a SMP architecture.

BACKGROUND INFORMATION

One widely accepted system architecture for personal computers has been the Symmetric Multi-Processing (SMP) architecture. Symmetric Multi-Processing (SMP) computer architectures are known in the art as overcoming the limitations of single or uni-processors in terms of processing speed and transaction throughput, among other things. Typically, commercially available SMP systems are generally "shared memory" systems, characterized in that multiple processing elements on a bus, or a plurality of busses, share a single global memory. In an SMP system, all memory is uniformly accessible to each processing element, which simplifies the task of dynamic load distribution. Processing of complex tasks can be distributed among various processing elements in the multiprocessor system while data used in the processing is substantially equally available to each of the processing elements undertaking any portion of the complex task. Similarly, programmers writing code for typical shared memory SMP systems do not need to be concerned with issues of data partitioning, as each of the processing elements has access to and shares the same, consistent global memory.

Each processing element in the SMP computer architecture may comprise a Direct Memory Access (DMA) controller and a processing unit, e.g., Central Processing Unit (CPU). The DMA controller may handle DMA transactions between the shared system memory and the associated processing unit in the processing element. That is, the DMA controller may allow blocks of information to be exchanged between the processing unit in the processing element and the shared system memory.

Each processing element in the SMP computer architecture may further comprise a plurality of Attached Processing Units (APU's). Each APU may be assigned to perform a particular task, e.g., image compression, image decompression, transformation, clipping, lighting, texturing, depth cueing, transparency processing, set-up, screen space rendering of graphics primitives, by the processing unit. The performance of a particular task by an APU may be accomplished in what is commonly referred to as a "remote procedure call." That is, the processing unit requests an APU to perform a particular task instead of the processing unit performing the task itself.

Typically, a remote procedure call comprises the steps of the processing unit issuing a command to the DMA controller to copy a certain piece of code that allows a particular APU to perform a particular task, e.g., image decompression. The remote procedure call further comprises the step of the processing unit issuing a command to the DMA controller to copy data, e.g., image decompression data, to the particular APU. The particular APU then receives an indication from the processing unit to start the operation on the particular data. Upon completion of the operation, the particular APU notifies the processing unit of the completion of the task by interrupting the processing unit. The remote procedure call further comprises the step of the processing unit issuing a command to the DMA controller to copy the resulting data, i.e., operation of the APU, to the shared memory of the SMP system.

Unfortunately, remote procedure calls involve the APU interrupting the processing unit which may result in the loss of processing time. That is, an interrupt may cause the processing unit to execute an operating system call which may require thousands of processing cycles.

It would therefore be desirable to develop an SMP system where the APU(s) do not interrupt the processing unit upon completion of its task(s) in one or more remote procedure calls.

SUMMARY

The problems outlined above may at least in part be solved in some embodiments by having the Direct Memory Access (DMA) controller during one or more remote procedure calls poll each of the one or more Attached Processing Unit's (APU's) associated with the one or more procedure calls to determine if any of the one or more APU's completed its task, i.e., operation on data, instead of having the particular APU notify the corresponding processing unit of the completion of its task by interrupting the processing unit. After each of the one or more attached processing units complete its operations, the DMA controller copies the resulting data, i.e., results of the operation performed by the particular APU, to the memory of the system.

In one embodiment, a method for executing one or more remote procedure calls comprises the step of a processing unit issuing a plurality of commands to a corresponding DMA controller to be executed during one or more remote procedure calls. One or more commands of the plurality of commands issued by the processing unit are to copy attached processing unit instructions associated with one or more APU's and data associated with the attached processing unit instructions from the memory to one or more APU's. The attached processing unit instructions may include instructions that enable the associated one or more APU's to perform one or more particular operations on the data associated with the attached processing unit instructions. The method further comprises the DMA controller issuing an indication to the one or more APU's to perform the one or more operations on the data. In prior art, the particular APU that completed its operation would notify the corresponding processing unit of its completion of the operation. Instead the DMA controller polls a status line of each of the one or more attached processing units to determine if any of the one or more attached processing units completed the one or more operations. The DMA controller then copies the results of the operations to the memory after each of the one or more attached processing units complete its operations.

In another embodiment of the present invention, the DMA controller comprises a plurality of first level queues that stores the plurality of commands issued by the processing unit. Each first level queue is associated with a different APU and therefore each first level queue stores one or more commands of the plurality of commands associated with a particular APU. The plurality of commands stored in the plurality of first level queues may be merged into a second level queue in the DMA controller. These merged plurality of commands may then be expanded into single line instructions in a third level queue. These single line instructions may be then be examined for bank conflicts. Those single line instructions that have no bank conflicts may then be stored in a fourth level queue which are ready to be executed by the DMA controller.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for executing one or more remote procedure calls. In one embodiment of the present invention, a method comprises the step of a processing unit issuing a plurality of commands to a corresponding DMA controller. One or more commands of the plurality of commands issued by the processing unit are to copy attached processing unit instructions associated with one or more Attached Processing Unit's (APU's) and data associated with the attached processing unit instructions from the shared memory to one or more APU's. The attached processing unit instructions may include instructions that enable the associated one or more APU's to perform one or more particular operations on the data associated with the attached processing unit instructions. The method further comprises the DMA controller issuing an indication to the one or more APU's to perform the one or more operations on the data. Instead of having the particular APU that completed its operation notify the corresponding processing unit of its completion of the operation, the DMA controller polls a status line of each of the one or more attached processing units to determine if any of the one or more attached processing units completed its operation. The DMA controller then copies the results of the operations to a memory after each of the one or more attached processing units completes its operation. It is noted that even though the following discusses the present invention in conjunction with a symmetric multi-processing system the present invention may be implemented in any system that comprises a processing unit and a plurality of attached processing units. It is further noted that remote procedure calls should not be interrupted in a restricted sense but interrupted broadly to include library calls or other tasks requested by the processing unit to the APU to perform.

Figure 1:
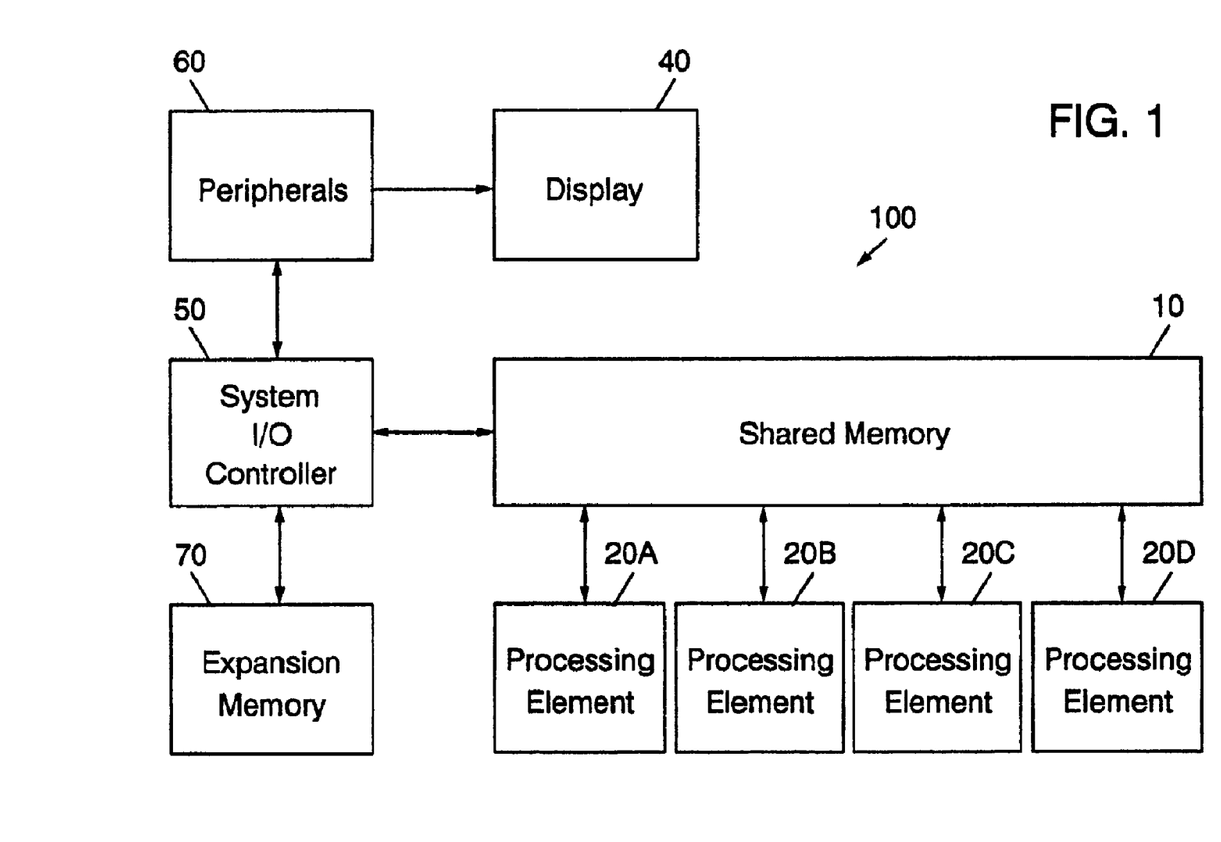
FIG. 1 illustrates a symmetric multiprocessor system configured in accordance with the present invention.

FIG. 1—Symmetric Multiprocessing System

FIG. 1 illustrates an embodiment of the present invention of a Symmetric Multi-Processing (SMP) system 100. Symmetric Multi-Processing system 100 comprises a shared memory 10, e.g., Dynamic Random Access Memory (DRAM), Static RAM (SRAM), coupled to a plurality of processing elements 20A–D. Processing elements 20A–D may collectively or individually be referred to as processing elements 20 or processing element 20, respectively. A more detailed description of processing elements 20 are provided below. Shared memory 10 is further coupled to a system Input/Output (I/O) controller 50. System I/O Controller 50 is coupled to one or more peripheral devices 60, e.g., SCSI host bus adapter, LAN adapter, graphics adapter, audio peripheral device, which may be coupled to a display 40. System I/O Controller 50 may further be coupled to expansion memory 70. Expansion memory 70 may be configured to provide a fast file system. It is noted that system 100 may comprise any number of processing elements 20 and peripheral devices 60 and that FIG. 1 is used for illustrative purposes only.

Figure 2:
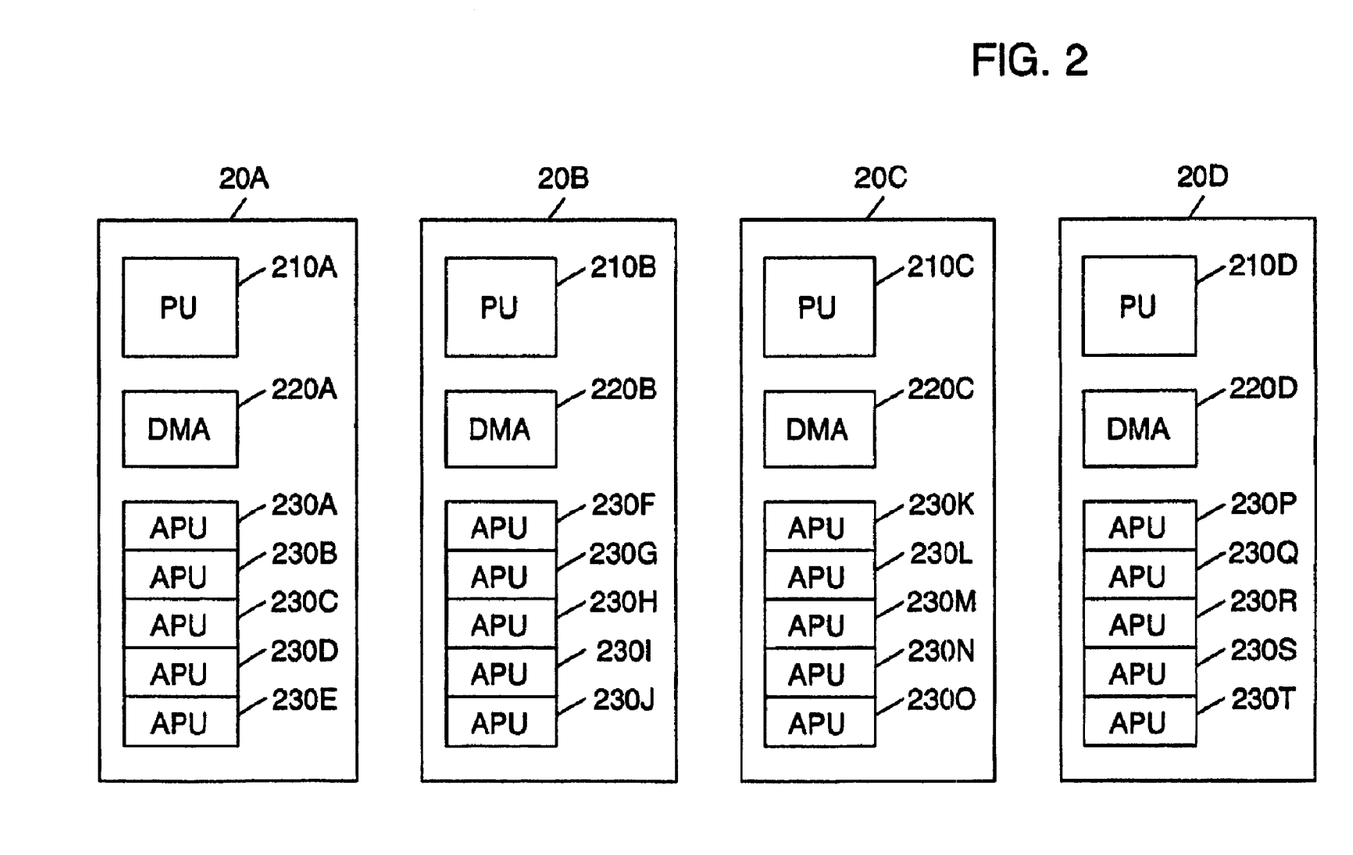
FIG. 2 illustrates an embodiment of processing elements in a symmetric multiprocessor system configured in accordance with the present invention.

FIG. 2—Processing Elements

FIG. 2 illustrates an embodiment of the present invention of processing elements 20A–D. Processing element 20A comprises a processing unit 210A, e.g., PowerPC™, a Direct Memory Address (DMA) controller 220A and a plurality of Attached Processing Units (APU's) 230A–E. Processing element 20B comprises a processing unit 210B, e.g., PowerPC™, a DMA controller 220B, and a plurality of APU's 230F–J. Processing element 20C comprises a processing unit 210C, e.g., PowerPC™, a DMA controller 220C, and a plurality of APU's 230K–O. Processing element 20D comprises a processing unit 210D, e.g., PowerPC™, a DMA controller 220D, and a plurality of APU's 230P–T. Processing units 210A–D may collectively or individually be referred to as Processing Units (PU's) 210 or Processing Unit (PU) 210, respectively. DMA controllers 220A–D may collectively or individually be referred to as DMA controllers 220 or DMA controller 220, respectively. APU's 230A–T may collectively or individually be referred to as APU's 230 or APU 230, respectively. It is noted that processing elements 20 may comprise any number of APU's 230.

Figure 3:
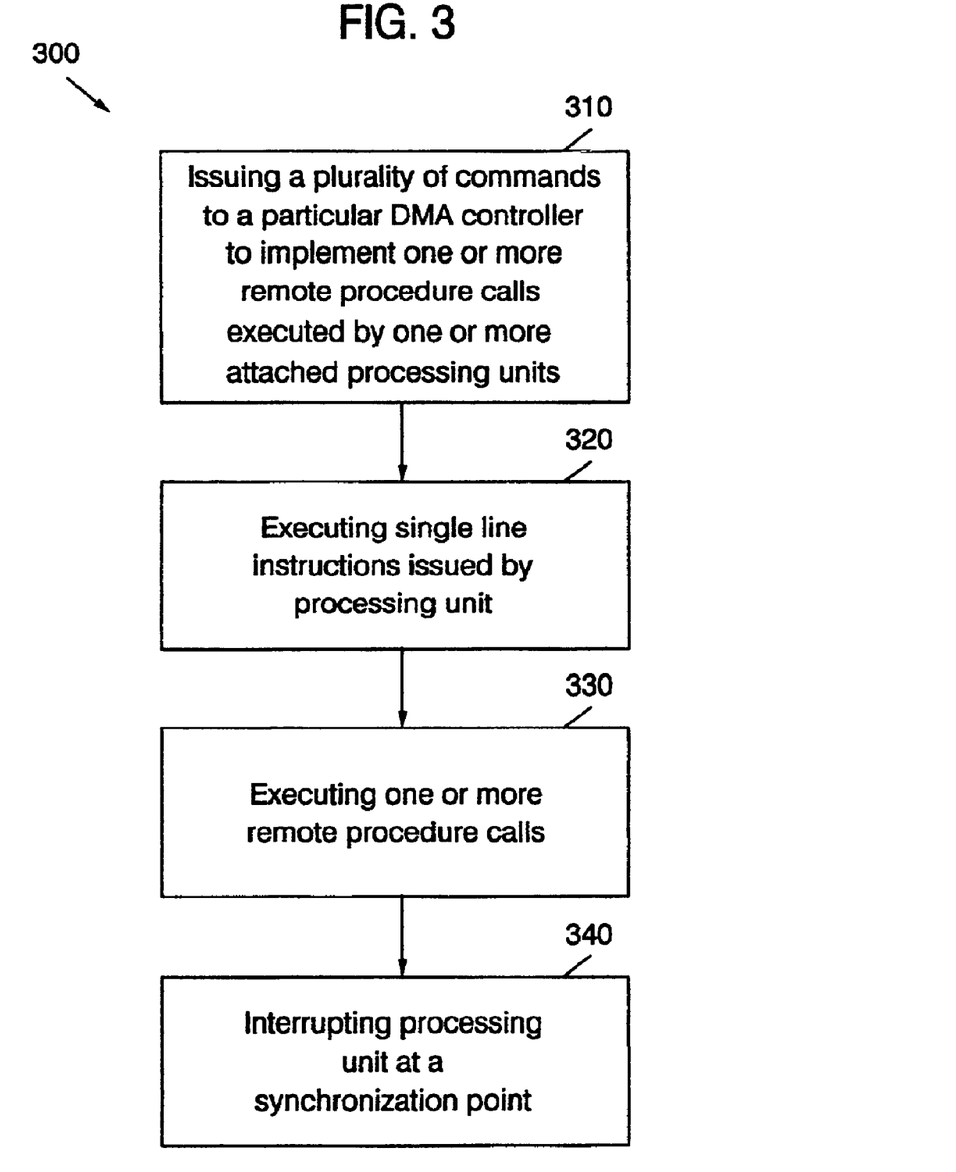
FIG. 3 is a flowchart of a method for executing one or more remote procedure calls without interrupting a processing unit.

FIG. 3—Flowchart of a Method for Executing One or More Remote Procedure Calls Without Interrupting a Processing Unit FIG. 3 illustrates a flowchart of one embodiment of the present invention of a method 300 for executing one or more remote procedure calls in an SMP system 100 where the APU(s) 230 do not interrupt the processing unit 210 upon completion of its task(s) in one or more remote procedure call(s). As stated in the Background Information section, a remote procedure call in prior art SMP systems typically comprises the steps of the processing unit issuing a command to the DMA controller to copy a certain piece of code that allows a particular APU to perform a particular task, e.g., image decompression. The remote procedure call further comprises the step of the processing unit issuing a command to the DMA controller to copy data, e.g., image decompression data, to the particular APU. The particular APU then receives an indication from the processing unit to start the operation on the particular data. Upon completion of the operation, the particular APU notifies the processing unit of the completion of the task by interrupting the processing unit. The remote procedure call further comprises the step of the processing unit issuing a command to the DMA controller to copy the resulting data, i.e., operation of the APU, to the shared memory of the SMP system. Unfortunately, the APU in remote procedure calls in prior art SMP systems interrupts the processing unit when the APU completes the task which may result in the loss of processing time of the processing unit. That is, an interrupt may cause the processing unit to implement an operating system call which may require thousands of processing cycles. It would therefore be desirable to develop an SMP system 100 where the APU(s) 230 do not interrupt the processing unit 210 upon completion of its task(s) in the remote procedure call(s). Method 300 is a method of executing one or more remote procedure calls where the APU(s) 230 do not interrupt the processing unit 210 upon completion of its tasks in one or more remote procedure call(s).

In step 310, processing unit 210, e.g., processing unit 210A, issues a plurality of commands, i.e., instructions, to a particular DMA controller 220, e.g., DMA controller 220A, so that one or more remote procedure calls may be executed. Each particular remote procedure call may be associated with a particular attached processing unit 230, e.g., APU 230A. A remote procedure call associated with a particular attached processing unit 230, e.g., APU 230A, may involve the following commands issued to a particular DMA controller 220, e.g., DMA controller 220A, by a particular processing unit 210, e.g., processing unit 210A. For example, processing unit 210, e.g., processing unit 210A, may issue a command to a particular DMA controller 220, e.g., DMA controller 220A, to copy line(s) or a page comprising attached processing unit instructions associated with a particular APU 230, e.g., APU 230A, in shared memory 10 to a particular address in the particular APU 230, e.g., APU 230A. Processing unit 210, e.g., processing unit 210A, may further issue a command to the same DMA controller 220, e.g., DMA controller 220A, to copy data, e.g., line(s) or page of data, associated with the attached processing unit instructions in shared memory 10 to a particular address in the same particular APU 230, e.g., APU 230A. Processing unit 210, e.g., processing unit 210A, may further issue a command to the same DMA controller 220, e.g., DMA controller 220A, to issue an indication to the same particular APU 230, e.g., APU 230A, to start the operation on the data, e.g., line(s) or page of data, associated with the attached processing unit instructions. Processing unit 210 may further issue a command to the same DMA controller 220, e.g., DMA controller 220A, to wait for the completion of the task, i.e., completion of the operation, by the same particular APU 230, e.g., APU 230A. Processing unit 210 may further issue a command to the same DMA controller 220, e.g., DMA controller 220A, to copy the results of the operation performed by the same particular APU 230, e.g., APU 230A, to shared memory 10 upon completion of the operation. Therefore, processing unit 210, e.g., processing unit 210A, may issue a plurality of commands to a particular DMA controller 220, e.g., DMA controller 220A, so that one or more remote procedure calls may be executed. For example, processing unit 210, e.g., processing unit 210A, may issue a plurality of commands to a particular DMA controller 220, DMA controller 220A, to implement five remote procedure calls associated with five different attached processing units 230, e.g., APU 230A–E.

Figure 4:
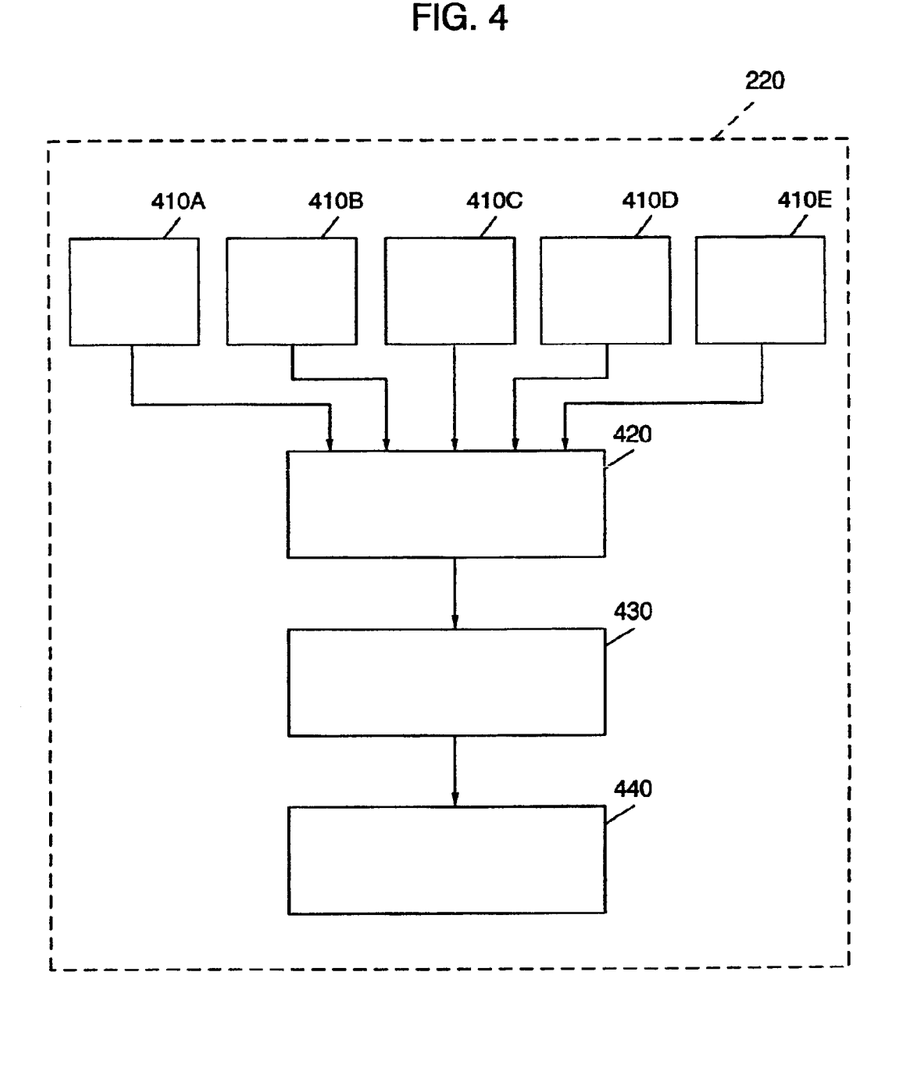
FIG. 4 illustrates an embodiment of a direct memory access controller configured in accordance with the present invention.

Referring to FIG. 4, FIG. 4 illustrates an embodiment of the present invention of a DMA controller 220. DMA controller 220 comprises a plurality of first level queues 410A–E. First level queues 410A–E may collectively or individually be referred to as first level queues 410 or first level queue 410, respectively. Each first level queue 410 stores one or more commands associated with a particular APU 230 out of the plurality of commands issued by processing unit 210, i.e., one or more commands out of the plurality of commands issued by processing unit 210 in step 310 that allow a particular APU 230 to perform a particular operation on particular data. For example, first level queue 410A may store one or more commands associated with a particular APU 230, e.g., APU 230A (FIG. 2), out of the plurality of commands issued by processing unit 210, e.g., processing unit 210A (FIG. 2), that enables a particular remote procedure call to be executed involving the particular APU 230, e.g., APU 230A (FIG. 2). First level queue 410B may store one or more commands associated with a particular APU 230, e.g., APU 230B (FIG. 2), out of the plurality of commands issued by processing unit 210, e.g., processing unit 210A (FIG. 2), that enables a particular remote procedure call to be executed involving the particular APU 230, e.g., APU 230B (FIG. 2). First level queue 410C may store one or more commands associated with a particular APU 230, e.g., 230C (FIG. 2), out of the plurality of commands issued by processing unit 210, e.g., 210A (FIG. 2), that enables a particular remote procedure call to be executed involving the particular APU 230, e.g., APU 230C (FIG. 2). First level queue 410D may store one or more commands associated with a particular APU 230, e.g., 230D (FIG. 2), out of the plurality of commands issued by processing unit 210, e.g., 210A (FIG. 2), that enables a particular remote procedure call to be executed involving the particular APU 230, e.g., APU 230D (FIG. 2). First level queue 410E may store one or more commands associated with a particular APU 230, e.g., 230E (FIG. 2), out of the plurality of commands issued by processing unit 210, e.g., 210A (FIG. 2), that enables a particular remote procedure call to be executed involving the particular APU 230, e.g., APU 230E (FIG. 2).

Referring to FIG. 4, the plurality of commands stored in first level queues 410 may be merged into a single second level queue 420. The plurality of commands merged into second level queue 420 may be expanded into single line instructions in a third level queue 430. For example, a command stored in second level queue 420 may instruct a particular DMA controller, e.g., DMA controller 220A (FIG. 2), to copy multiple lines, e.g., copy lines x, x+1, x+2, in shared memory 10 to a particular address in a particular APU, e.g., APU 230A (FIG. 2). The command to copy multiple lines may then be expanded to single line instructions, e.g., copy line x, copy line x+1, copy line x+2, in queue 430. In another embodiment of the present invention, the plurality of commands stored in first level queues 410 may be first expanded into second level queue 420. The plurality of commands expanded into second level queue 420 may then be merged into single instructions in third level queue 430.

The single line instructions stored in queue 430 may then be examined for bank conflicts. A method for detecting bank conflicts is described in U.S. patent application Ser. No. 09/736,356, filed on Dec. 14, 2000, entitled "Token Based DMA," Attorney Docket No. AUS9-2000-0794-US1, which is hereby incorporated herein by reference in its entirety. Those single line instructions stored in queue 430 that have no bank conflicts may then be stored in a fourth level queue 440 ready to be executed by DMA controller 220.

Referring to FIG. 3, in step 320, DMA controller 220, e.g., DMA controller 220A, executes the single line instructions issued by processing unit 210 in step 310. That is, DMA controller 220 executes the plurality of commands, i.e., instructions, issued by processing unit 210 that have been expanded and detected for bank conflicts, i.e., instructions stored in queue 440.

In step 330, one or more remote procedure calls may be executed. During the execution of the one or more remote procedure calls, the one or more associated attached processing units 230, e.g., APU230A–E, do not interrupt the corresponding processing unit 210, e.g., processing unit 210A. It is noted that the one or more remote procedure calls executed may be interleaved. It is further noted that more than one remote procedure call may be executed involving the same attached processing unit 230, e.g., APU 230A, without interrupting the corresponding processing unit 210, e.g., processing unit 210A. A more detailed description of the step of executing one or more remote procedure calls is provided in FIG. 5.

In step 340, processing unit 210 may be interrupted by DMA controller 220 at a synchronization point. For example, a synchronization point may occur after a certain number of remote procedure calls have been completed.

Figure 5:
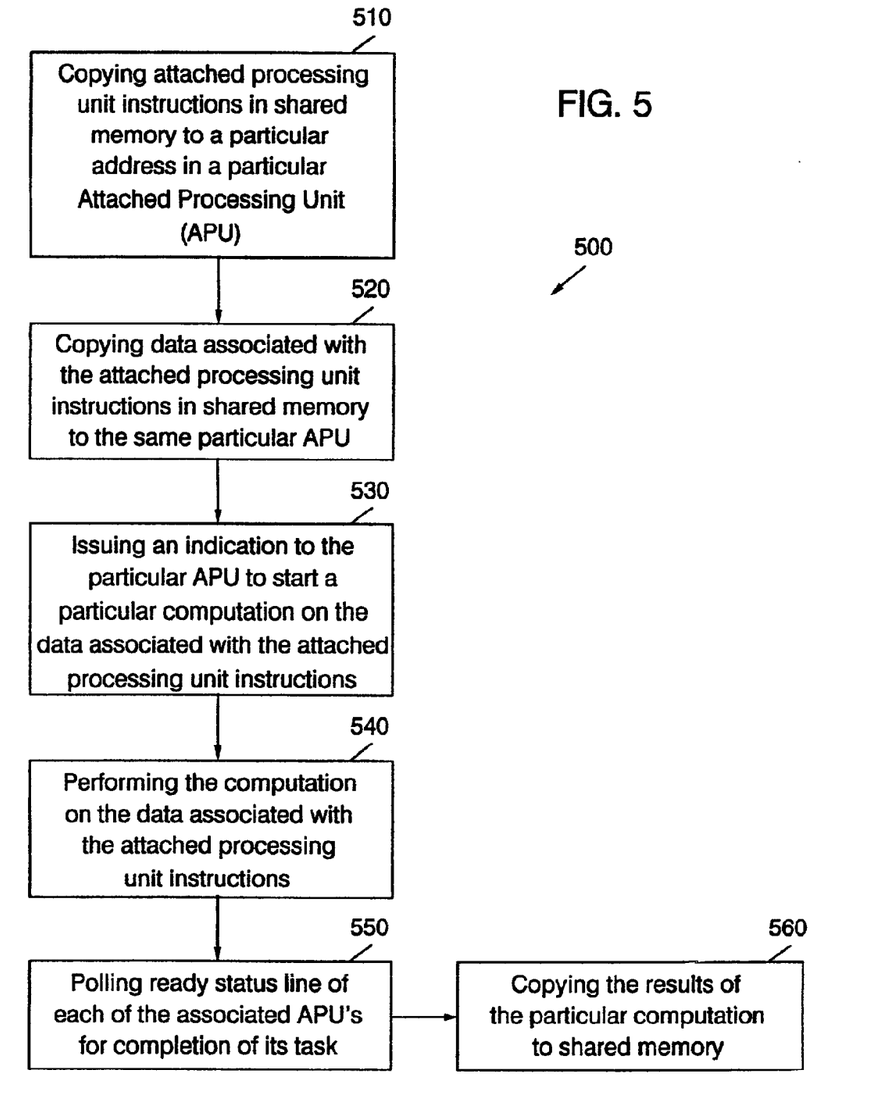
FIG. 5 is a flowchart of a method of the step for executing one or more remote procedure calls.

FIG. 5—Flowchart of a Method of the Step for Executing One or More Remote Procedure Calls in Method 300

FIG. 5 illustrates a flowchart of one embodiment of the present invention of a method 500 of the step of executing one or more remote procedure calls in method 300.

In step 510, DMA controller 220, e.g., DMA controller 220A, executes the command, i.e., single line instruction stored in queue 440 (FIG. 4), issued by a particular processing unit, e.g., processing unit 210A, to copy attached processing unit instructions associated with a particular APU 230, e.g., APU 230A, in shared memory 10 to a particular address in the particular APU 230, e.g., APU 230A. For example, processing unit 210, e.g., processing unit 210A, may issue a command to copy line(s) or a page comprising attached processing unit instructions in shared memory 10 to a particular address in a particular APU 230, e.g., APU 230A. It is noted that attached processing unit instructions may include instructions that enable a particular APU 230, e.g., APU 230A, to perform a particular operation.

In step 520, DMA controller 220, e.g., DMA controller 220A, executes the command, i.e., single line instruction stored in queue 440 (FIG. 4), to copy data, e.g., line(s) or page of data, associated with attached processing unit 230, e.g., APU 230A, as in step 510.

Upon DMA controller 220, e.g., DMA controller 220A, executing the commands, i.e., instructions, issued by processing unit 210 in steps 510 and 520, DMA controller 220, e.g., DMA controller 220A, issues an indication to the particular APU 230, e.g., APU 230A, to start a particular operation on the data associated with the attached processing unit instructions in step 530. That is, DMA controller 220, e.g., DMA controller 220A, issues an indication to start the operation on the data to the APU 230, e.g., APU 230A, that received the instructions to perform a particular operation and the associated data from DMA controller 220, e.g., DMA controller 220A, upon DMA controller 220 executing the commands, i.e., instructions, in steps 510 and 520.

In step 540, the particular APU 230, e.g., APU 230A, performs the operation on the associated data. In the prior art, the particular APU 230 interrupts processing unit 210 to notify processing unit 210 of the completion of the task, i.e., completion of the operation. However, in step 550 of method 500, the associated DMA controller 220, e.g., DMA controller 220A, waits for the particular APU 230, e.g., APU 230A, to complete the task. That is, DMA controller 220, e.g., DMA controller 220A, polls the ready status line of each of the associated APU's 230, e.g., APU 230A–E, to determine if any of the associated APU's 230, e.g., APU 230A–E, completed their respective task.

In step 560, DMA controller 220, e.g., DMA controller 220A, copies the results of the operation performed by each particular APU 230, e.g., APU 230A, to shared memory 10 upon completion of its operation. That is, upon DMA controller 220, e.g., DMA controller 220A, detecting the particular APU 230, e.g., APU 230A, completing its task, DMA controller 220, e.g., DMA controller 220A, copies the results of the operation performed by the particular APU 230, e.g., APU 230A, to shared memory 10.

It is noted that a person of ordinary skill would understand that steps 510–560 need not be executed sequentially but in parallel so that one or more remote procedure calls may be executed in an interleaved fashion. It is further noted that remote procedure calls should not be interrupted in a restricted sense but interrupted broadly to include it library calls or other tasks requested by the processing unit to the APU to perform. It is further noted that even though the embodiments of the present invention are described above in conjunction with a symmetric multi-processing system the present invention may be implemented in any system that comprises a processing unit and a plurality of attached processing units.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A system comprising:

a shared memory; and a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein each of said plurality of attached processing units in each of said plurality of processing elements does not interrupt said corresponding processing unit upon completion of each of said one or more remote procedure calls wherein said direct memory access controller is configured to poll each of said plurality of attached processing units to determine if any of said plurality of attached processing units completed its operation during said one or more remote procedure calls.

2. The system as recited in claim 1, wherein said direct memory access controller in each of said plurality of processing elements comprises a plurality of first level queues for storing said plurality of commands issued by said corresponding processing unit.

3. The system as recited in claim 2, wherein each of said plurality of first level queues are configured to store one or more commands of said plurality of commands associated with a different attached processing unit.

4. The system as recited in claim 2, wherein said plurality of commands comprise a first instruction to copy attached processing unit instructions associated with a particular attached processing unit from said shared memory to said particular attached processing unit, wherein said plurality of commands comprise a second instruction to copy data associated with said attached processing unit instructions from said shared memory to said particular attached processing unit.

5. The system as recited in claim 4, wherein said attached processing unit instructions associated with said particular attached processing unit comprise instructions that enable said particular attached processing unit to perform a particular operation on said data associated with said attached processing unit instructions associated with said particular attached processing unit.

6. The system as recited in claim 5, wherein said plurality of commands comprise a third instruction to copy the results of said particular operation to said shared memory.

7. The system as recited in claim 5, wherein said direct memory access controller is configured to poll a status line of each of said plurality of attached processing units to determine if any of said plurality of attached processing units completed its operation during said one or more remote procedure calls.

8. The system as recited in claim 4, wherein said first and second instructions to copy attached processing unit instructions and data associated with said attached processing unit instructions are requests to copy one or more lines of memory in said shared memory to said particular attached processing unit.

9. A system comprising:

a shared memory; and a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein each of said plurality of attached processing units in each of said plurality of processing elements does not interrupt said corresponding processing unit upon completion of each of said one or more remote procedure calls;

wherein said direct memory access controller in each of said plurality of processing elements comprises a plurality of first level queues for storing said plurality of commands issued by said corresponding processing unit;

wherein said direct memory access controller comprises a second queue, wherein said plurality of commands in said plurality of first queues are merged in said second queue.

10. The system as recited in claim 9, wherein said direct memory access controller comprises a third queue, wherein said third queue expands said merged plurality of commands stored in said second queue into single line instructions.

11. The system as recited in claim 10, wherein said direct memory access controller executes said expanded merged plurality of commands stored in said third queue without bank conflicts.

12. A system comprising:

a shared memory; and a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein each of said plurality of attached processing units in each of said plurality of processing elements does not interrupt said corresponding processing unit upon completion of each of said one or more remote procedure calls;

wherein said direct memory access controller is configured to interrupt said corresponding processing unit at a synchronization point, wherein said synchronization point occurs after said one or more remote procedure calls are performed.

13. A system comprising:

a shared memory; and a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein said direct memory access controller is configured to poll a status line of each of said plurality of attached processing units to determine if any of said plurality of attached processing units completed its operation during said one or more remote procedure calls.

14. The system as recited in claim 13, wherein said direct memory access controller in each of said plurality of processing elements comprises a plurality of first level queues for storing said plurality of commands issued by said corresponding processing unit.

15. The system as recited in claim 14, wherein each of said plurality of first level queues are configured to store one or more commands of said plurality of commands associated with a different attached processing unit.

16. The system as recited in claim 14, wherein said plurality of commands comprise a first instruction to copy attached processing unit instructions associated with a particular attached processing unit from said shared memory to said particular attached processing unit, wherein said plurality of commands comprise a second instruction to copy data associated with said attached processing unit instructions from said shared memory to said particular attached processing unit.

17. The system as recited in claim 16, wherein said attached processing unit instructions associated with said particular attached processing unit comprise instructions that enable said particular attached processing unit to perform a particular operation on said data associated with said attached processing unit instructions associated with said particular attached processing unit.

18. The system as recited in claim 17, wherein said plurality of commands comprise a third instruction to copy the results of said particular operation to said shared memory.

19. The system as recited in claim 16, wherein said first and second instructions to copy attached processing unit instructions and data associated with said attached processing unit instructions are requests to copy one or more lines of memory in said shared memory to said particular attached processing unit.

20. A system comprising:

a shared memory; and a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein said direct memory access controller is configured to poll a status line of each of said plurality of attached processing units to determine if any of said plurality of attached processing units completed its operation during said one or more remote procedure calls;

wherein said direct memory access controller in each of said plurality of processing elements comprises a plurality of first level queues for storing said plurality of commands issued by said corresponding processing unit;

wherein said direct memory access controller comprises a second queue, wherein said plurality of commands in said plurality of first queues are merged in said second queue.

21. The system as recited in claim 20, wherein said direct memory access controller comprises a third queue, wherein said third queue expands said merged plurality of commands stored in said second queue into single line instructions.

22. The system as recited in claim 21, wherein said direct memory access controller executes said expanded merged plurality of commands stored in said third queue without bank conflicts.

23. A system comprising:
a shared memory; and
a plurality of processing elements coupled to said shared memory, wherein each of said plurality of processing elements comprises a processing unit, a direct memory access controller and a plurality of attached processing units, wherein said direct memory access controller is configured to receive a plurality of commands from a corresponding processing unit to be executed during one or more remote procedure calls, wherein said direct memory access controller is configured to poll a status line of each of said plurality of attached processing units to determine if any of said plurality of attached processing units completed its operation during said one or more remote procedure calls;

wherein said direct memory access controller is configured to interrupt said corresponding processing unit at a synchronization point, wherein said synchronization point occurs after said one or more remote procedure calls are performed.

24. A method for executing one or more remote procedure calls comprising the steps of:
issuing a plurality of commands by a processing unit to a direct memory access controller to be executed during one or more remote procedure calls, wherein said plurality of commands comprise a first instruction to copy attached processing unit instructions associated with a particular attached processing unit from a memory to said particular attached processing unit, wherein said plurality of commands comprise a second instruction to copy data associated with said attached processing unit instructions from said memory to said particular attached processing unit;
issuing to said particular attached processing unit an indication to start a particular operation on said data associated with said particular attached processing unit instructions; and
polling by said direct memory access controller a status line of each of a plurality of attached processing units to determine if any of said plurality of attached processing units completed its particular operation;
wherein said plurality of attached processing units do not interrupt said processing unit upon completion of each of said one or more remote procedure calls.

25. The method as recited in claim 24, wherein said attached processing unit instructions enable said particular attached processing unit to perform said particular operation.

26. The method as recited in claim 24, wherein said indication to start said particular operation on said data is issued from said direct memory access controller to said particular attached processing unit.

27. The method as recited in claim 24, wherein said direct memory access controller comprises a plurality of first level queues for storing said plurality of commands.

28. The method as recited in claim 24, wherein said first and second instructions to copy attached processing unit instructions and data associated with said attached processing unit instructions are requests to copy one or more lines in said memory to said particular attached processing unit.

29. A method for executing one or more remote procedure calls comprising the steps of:
issuing a plurality of commands by a processing unit to a direct memory access controller to be executed during one or more remote procedure calls, wherein said plurality of commands comprise a first instruction to copy attached processing unit instructions associated with a particular attached processing unit from a memory to said particular attached processing unit, wherein said plurality of commands comprise a second instruction to copy data associated with said attached processing unit instructions from said memory to said particular attached processing unit;
issuing to said particular attached processing unit an indication to start a particular operation on said data associated with said particular attached processing unit instructions;
polling a status line of each of a plurality of attached processing units to determine if any of said plurality of attached processing units completed its particular operation; and
interrupting said processing unit at a synchronization point, wherein said synchronization point occurs after said one or more remote procedure calls are performed;
wherein said plurality of attached processing units do not interrupt said processing unit upon completion of each of said one or more remote procedure calls.

30. The method as recited in claim 29, wherein each of said plurality of first level queues are configured to store one or more commands of said plurality of commands associated with a different attached processing unit.

31. A method for executing one or more remote procedure calls comprising the steps of:
issuing a plurality of commands by a processing unit to a direct memory access controller to be executed during one or more remote procedure calls, wherein said plurality of commands comprise a first instruction to copy attached processing unit instructions associated with a particular attached processing unit from a memory to said particular attached processing unit, wherein said plurality of commands comprise a second instruction to copy data associated with said attached processing unit instructions from said memory to said particular attached processing unit;
issuing to said particular attached processing unit an indication to start a particular operation on said data associated with said particular attached processing unit instructions; and polling a status line of each of a plurality of attached processing units to determine if any of said plurality of attached processing units completed its particular operation;

wherein said plurality of attached processing units do not interrupt said processing unit upon completion of each of said one or more remote procedure calls, wherein said direct memory access controller comprises a plurality of first level queues for storing said plurality of commands, wherein said direct memory access controller comprises a second queue, wherein said plurality of commands in said plurality of first level queues are merged in said second queue.

32. The method as recited in claim 31, wherein said direct memory access controller comprises a third queue, wherein said third queue expands said merged plurality of commands stored in said second queue into single line instructions.

33. The method as recited in claim 32, wherein said direct memory access controller executes said expanded merged plurality of commands stored in said third queue without bank conflicts.

34. A method for executing one or more remote procedure calls comprising the steps of:

issuing a plurality of commands by a processing unit to a direct memory access controller to be executed during one or more remote procedure calls, wherein said plurality of commands comprise a first instruction to copy attached processing unit instructions associated with a particular attached processing unit from a memory to said particular attached processing unit, wherein said plurality of commands comprise a second instruction to copy data associated with said attached processing unit instructions from said memory to said particular attached processing unit;

issuing to said particular attached processing unit an indication to start a particular operation on said data associated with said particular attached processing unit instructions; and polling a status line of each of a plurality of attached processing units to determine if any of said plurality of attached processing units completed its particular operation;

wherein said plurality of attached processing units do not interrupt said processing unit upon completion of each of said one or more remote procedure calls, wherein said direct memory access controller comprises a plurality of first level queues for storing said plurality of commands, wherein said direct memory access controller comprises a second queue, wherein said plurality of commands in said plurality of first queues are expanded in said second queue.

35. The method as recited in claim 34, wherein said direct memory access controller comprises a third queue, wherein said third queue merges said expanded plurality of commands stored in said second queue into single line instructions.

36. The method as recited in claim 35, wherein said direct memory access controller executes said expanded merged plurality of commands stored in said third queue without bank conflicts.

* * * * *